(12) United States Patent
Yoshimura et al.

(10) Patent No.: US 10,676,616 B2
(45) Date of Patent: Jun. 9, 2020

(54) POLYAMIDE RESIN COMPOSITION

(71) Applicant: TOYOBO CO., LTD., Osaka (JP)

(72) Inventors: Nobuhiro Yoshimura, Shiga (JP); Kazuki Iwamura, Shiga (JP)

(73) Assignee: TOYOBO CO., LTD., Osaka (JP)

(*) Notice: Subject to any disclaimer, the term of this patent is extended or adjusted under 35 U.S.C. 154(b) by 0 days.

(21) Appl. No.: 16/461,463

(22) PCT Filed: Nov. 24, 2017

(86) PCT No.: PCT/JP2017/042186
§ 371 (c)(1),
(2) Date: May 16, 2019

(87) PCT Pub. No.: WO2018/101163
PCT Pub. Date: Jun. 7, 2018

(65) Prior Publication Data
US 2019/0345331 A1  Nov. 14, 2019

(30) Foreign Application Priority Data

Dec. 1, 2016 (JP) .................... 2016-233958

(51) Int. Cl.
C08L 77/02 (2006.01)
C08J 5/04 (2006.01)
C08L 77/06 (2006.01)

(52) U.S. Cl.
CPC ............. C08L 77/02 (2013.01); C08J 5/043 (2013.01); C08L 77/06 (2013.01); C08J 2377/02 (2013.01); C08J 2377/06 (2013.01); C08J 2477/06 (2013.01); C08L 2205/025 (2013.01)

(58) Field of Classification Search
None
See application file for complete search history.

(56) References Cited

U.S. PATENT DOCUMENTS

| | | | |
|---|---|---|---|
| 2005/0234180 A1 | 10/2005 | Ono et al. | |
| 2010/0116482 A1 | 8/2010 | Goto et al. | |
| 2011/0200784 A1* | 8/2011 | Agarwal | D01F 1/07 428/97 |
| 2012/0046398 A1 | 2/2012 | Topoulos | |
| 2015/0056393 A1 | 2/2015 | Mizutani et al. | |
| 2017/0081498 A1 | 3/2017 | Yoshimura | |

FOREIGN PATENT DOCUMENTS

| | | |
|---|---|---|
| JP | 57-80449 | 5/1982 |
| JP | 57-168940 | 10/1982 |
| JP | 57-212252 | 12/1982 |
| JP | 60-88067 | 5/1985 |
| JP | 7-47690 | 2/1995 |
| JP | 2001-26712 | 1/2001 |
| JP | 2002-114905 | 4/2002 |
| JP | 3271328 | 4/2002 |
| JP | 2003-277604 | 10/2003 |
| JP | 2005-306950 | 11/2005 |
| JP | 2005-330478 | 12/2005 |
| JP | 2006-29118 | 10/2006 |
| JP | 2006-528260 | 12/2006 |
| JP | 3985316 | 10/2007 |
| JP | 2008-527127 | 7/2008 |
| JP | 2008-527129 | 7/2008 |
| JP | 2008-261620 | 10/2008 |
| JP | 2010-270318 | 12/2010 |
| JP | 2013-535566 | 9/2013 |
| JP | 2016-53150 | 4/2016 |
| JP | 2016-138192 | 8/2016 |
| WO | 2014/050275 | 4/2014 |
| WO | 2016/132829 | 8/2016 |

OTHER PUBLICATIONS

International Search Report dated Feb. 20, 2018 in International Application No. PCT/JP2017/042186.

* cited by examiner

*Primary Examiner* — Ana L. Woodward
(74) *Attorney, Agent, or Firm* — Wenderoth, Lind & Ponack, L.L.P.

(57) ABSTRACT

The polyamide resin composition according to the present invention contains a polyamide resin (A) wherein an average carbon number of an alkylene group between amide groups is 5 or less and a polyamide resin (B) wherein an average carbon number of an alkylene group between amide groups is more than 5, wherein a ratio by mass (A)/(B) of the polyamide resin (A) to the polyamide resin (B) is from 98/2 to 40/60, and wherein, to 100 parts by mass of a total amount of the polyamide resin (A) and the polyamide resin (B), 0.5 to 20 part(s) by mass of a metal cyanide salt of a composition formula (1) ($A_x[M(CN)_y]$) is compounded.

7 Claims, No Drawings

POLYAMIDE RESIN COMPOSITION

TECHNICAL FIELD OF THE INVENTION

The present invention relates to a polyamide resin composition which exhibits an effective resistance to chemicals against snow-melting agents such as calcium chloride and zinc chloride and against coolants for automobile engines, and also exhibits an excellent thermal aging resistance.

BACKGROUND ART

In automobile parts, particularly in the parts made of resin used in an engine room, circumstances for their use are becoming severe as a result of temperature rise in an engine coolant and in the engine room, in accordance with increased engine performance and increased output. Further, in a cold district, a lot of anti-freezing agent for roads such as calcium chloride and zinc chloride is sprinkled as a snow-melting agent. Therefore, engine parts are also exposed to those chemicals as well. In the conventional Nylon 6 and Nylon 66, deterioration of the resin progresses under such severe using environments. Accordingly, several improvements have been attempted therefor.

Examples thereof are a method wherein fine glass fiber having specific fineness processed with a specific surface treating agent is used as a reinforcing material for Nylon 66 (Patent Document 1), a method wherein a high-melting polyamide having a melting point of 300° C. or higher (such as Nylon 6T type) is compounded (for example, Patent Documents 2 and 3) and a method wherein a resin of polypropylene type is compounded with Nylon 66 (Patent Document 4). However, any of those methods does not satisfy all of moldability, fluidity, weldability, low water absorbability and durability. Accordingly, there is yet room for improvement therein.

A polyamide resin has excellent characteristics such as mechanical characteristics, thermal aging resistance, and moldability. Accordingly, it has been widely utilized in various parts such as automobile parts, electric and electronic parts and industrial machine parts. However, deterioration by an action of heat and light is unavoidable for the polyamide resin. As to a method for enhancing the thermal aging resistance of the polyamide resin, methods wherein copper halide, potassium halide, oxazole compound or the like is added as a thermostabilizer have been known from old time already (for example, Patent Document 5).

As a result of these arts, the polyamide resin is used in such parts which are exposed to high-temperature environments of about 140° C. during use, in the fields of the automobile parts and the electric and electronic parts.

However, with regard to the engine room of automobiles for example, environmental temperature in the engine room has become high as a result of increase in engine output, tendency of arranging the parts with high density, etc. in recent years. Accordingly, there has been a demand for high level of thermal aging resistance which has not been aimed until now.

In order to fulfill this demand, there have been proposed a method wherein polyamide is compounded with finely granulated element iron (Patent Document 6), a method wherein polyamide is compounded with finely granulated and dispersed metal powder (Patent Document 7), a method wherein a mixture of two kinds of polyamides having different melting points from each other is compounded with a copper compound and iron oxide (Patent Document 8), a method wherein polyamide is compounded with a thermostabilizer such as copper iodide or potassium iodide and a composite oxide such as tri-iron tetraoxide (containing iron (II) oxide) (Patent Document 9), etc. It has been said that products obtained by these methods are excellent in thermal aging resistance even under high-temperature environments of about 200° C.

However, in the methods of Patent Documents 6 and 7, there is a danger of ignition during preparation of a composition whereby the preparation is not easy. In the method of Patent Document 8, there is a disadvantage that the effect is achieved only by a very limited composition. In the method of Patent Document 9, there may be a case wherein stability and reproducibility of the thermal aging resistance and the mechanical strength are inferior. As such, any of them is to be still improved.

PRIOR ART DOCUMENTS

Patent Documents

Patent Document 1: Japanese Patent No. 3271328
Patent Document 2: Japanese Patent No. 3985316
Patent Document 3: Japanese Patent Application Laid-Open (JP-A) No. 2002-114905
Patent Document 4: Japanese Patent Application Laid-Open (JP-A) No. 2006-291118
Patent Document 5: Japanese Patent Pregrant Publication (JP-B) No. 47690/95
Patent Document 6: Japanese Patent Application Laid-Open (JP-A) No. 2006-528260
Patent Document 7: Japanese Patent Application Laid-Open (JP-A) No. 2008-527127
Patent Document 8: Japanese Patent Application Laid-Open (JP-A) No. 2008-527129
Patent Document 9: Japanese Patent Application Laid-Open (JP-A) No. 2010-270318

Disclosure of the Invention

Problem that the Invention is to Solve

The present invention aims to provide a polyamide resin composition which exhibits an effective resistance to snow-melting agents such as calcium chloride and zinc chloride and to coolants for automobile engines, and also exhibits an excellent thermal aging resistance in a level durable to high-temperature and long-term environments of 200° C. and longer than 1000 hours, and further exhibits excellent mechanical characteristics.

Means for Solving the Problem

The inventors found that the thermal aging resistance of a polyamide resin can be expressed by compounding it with a metal cyanide salt. The inventors further found that, when this compound is used together with a specific polyamide resin (a polyamide resin composition wherein specific polyamide resins are mixed in a specific mixing ratio), it exhibits an excellent resistance to snow-melting agents such as calcium chloride and zinc chloride and to coolants for automobile engines whereby they achieved the present invention.

Thus, the present invention is as follows.

[1] A polyamide resin composition containing a polyamide resin (A) wherein an average carbon number of an alkylene group between amide groups is 5 or less and a polyamide resin (B) wherein an average carbon number of an alkylene group between amide groups is more than 5, wherein a ratio by mass (A)/(B) of the polyamide resin (A) to the polyamide resin (B) is from 98/2 to 40/60, and wherein, to 100 parts by mass of a total amount of the polyamide resin (A) and the polyamide resin (B), 0.5 to 20 part(s) by mass of a metal cyanide salt of a following composition formula (1) is compounded.

General composition formula ... $A_x[M(CN)_y]$     (1)

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of X and a is a valence of A.)

[2] The polyamide resin composition according to [1], wherein the polyamide resin (A) is at least one member selected from a group consisting of polyamide 6, polyamide 66 and polyamide MXD6.

[3] The polyamide resin composition according to [1] or [2], wherein the polyamide resin (B) is at least one member selected from a group consisting of polyamide 610, polyamide 1010, polyamide 1012, polyamide 11, polyamide 12 and polyamide 10T/11.

[4] The polyamide resin composition according to any of [1] to [3], wherein the polyamide resin composition further contains a reinforcing material (D) in an amount of 5 to 60% by mass.

[5] The polyamide resin composition according to any of [1] to [4], wherein M in the general composition formula (1) is iron.

[6] The polyamide resin composition according to any of [1] to [4], wherein the metal cyanide salt in the general composition formula (1) is one or more member(s) selected from a group consisting of alkali metal hexacyanoferrate (II) and alkali metal hexacyanoferrate (III).

[7] The polyamide resin composition according to any of [1] to [6], wherein, to 100 parts by mass of the total amount of the polyamide resin (A) and the polyamide resin (B), a copper compound is compounded in an amount of 0.0001 to 1 part by mass as copper.

Advantages of the Invention

In accordance with the present invention, it is now possible to provide a polyamide resin composition which exhibits an effective resistance to snow-melting agents such as calcium chloride and zinc chloride and to coolants for automobile engines, and also exhibits an excellent thermal aging resistance in a level durable to high-temperature and long-term environments of 200° C. and longer than 1000 hours, and further exhibits excellent mechanical characteristics. Even when a main ingredient of the polyamide resin is a highly applicable polyamide resin such as polyamide 6 or polyamide 66, the above effects are still exhibited.

BEST MODE FOR CARRYING OUT THE INVENTION

Hereinafter, the present invention will be specifically illustrated.

The polyamide resin which can be used in the present invention is not particularly limited. Examples thereof include an open-ring polymer of cyclic lactam, a polycondensate of amino carboxylic acid, a polycondensate of dibasic acid with diamine and copolymers thereof. Specific examples thereof include an aliphatic polyamide such as polycaproamide (polyamide 6), polyhexamethyleneadipamide (polyamide 66), polytetramethyleneadipamide (polyamide 46), polyhexamethylenesebacamide (polyamide 610), polyhexamethylenedodecamide (polyamide 612), polydecamethylenesebacamide (polyamide 1010), poly-lauryllactam (polyamide 12) and poly-11-aminoundecanoic acid (polyamide 11); an aliphatic-aromatic polyamide such as poly-m-xyleneadipamide (polyamide MXD6), polyhexamethyleneterephthalamide (polyamide 6T), polydecamethyleneterephthalamide (polyamide 10T), polyhexamethyleneisophthalamide (polyamide 6I), polynonamethyleneterephthalamide (polyamide 9T) and polytetramethyleneisophthalamide (polyamide 4I); alicyclic polyamides such as polyhexamethylene hexahydroterephthalamide (polyamide 6T(H)), polybis(3-methyl-4-aminocyclohexyl)methane terephthalamide (polyamide PACMT), polybis(3-methyl-4-aminohexyl)methane isophthalamide (polyamide PACMI), polybis-(3-methyl-4-aminocyclohexyl)methane dodecamide (polyamide PACM 12) and polybis(3-methyl-4-aminocyclohexyl)methane tetradecamide (polyamide PACM14); and copolymers and mixtures thereof. As to the polyamide, there may be exemplified polyamide 6/66 copolymer, polyamide 66/6T copolymer, polyamide 6T/12 copolymer, polyamide 6T/11 copolymer, polyamide 10T/11 copolymer, polyamide 6T/6I copolymer, polyamide 6T/6I/12 copolymer, polyamide 6T/610 copolymer and polyamide 6T/6I/6 copolymer.

It is necessary that the polyamide resin composition of the present invention contains a polyamide resin (A) wherein an average carbon number of an alkylene group between amide groups is 5 or less and a polyamide resin (B) wherein an average carbon number of an alkylene group between amide groups is more than 5.

Carbon number of an alkylene group stands for a number of carbon (atoms) constituting the alkylene group. The alkylene group may not be limited to a linear one but may be branched or may form a ring. The carbon number of the alkylene group does not include a number of carbon constituting an aromatic ring. For example, a number of carbon constituting an alkylene group in ε-caprolactam is 5. Similarly, a number of carbon constituting an alkylene group in hexamethylenediamine is 6, a number of carbon constituting an alkylene group in adipic acid is 4, a number of carbon constituting an alkylene group in m-xylylenediamine is 2, and a number of carbon constituting an alkylene group in bis(3-methyl-4-aminocyclohexyl)methane is 15.

Accordingly, an average carbon number of an alkylene group between amide groups (i.e. an average carbon number of an alkylene group per one amide group) is 5 for polyamide 6, and is 10 for polyamide 11. In polyamide 66, there are 6 carbons constituting an alkylene group in hexamethylenediamine and 4 carbons constituting an alkylene group in adipic acid between two amide groups whereby the average carbon number of the alkylene group between the amide groups is 5. In polyamide PACM 14, there are 15 carbons constituting an alkylene group in bis(3-methyl-4-aminocyclohexyl)methane and 12 carbons constituting an alkylene group in tetradecan-dioic acid between two amide groups whereby the average carbon number of the alkylene group between the amide groups is 13.5. In polyamide 10T, there are 1C carbons constituting an alkylene group in decamethylenediamine between two amide groups whereby the average carbon number of the alkylene group between the amide groups is 5. In the case of a copolymer, the average carbon number of the alkylene group between amide groups is 7.5 for polyamide 1CT/11 copolymer (in a 50/50 molar ratio).

As to the polyamide resin (A), it is possible to use, for example, a polyamide resin where an average carbon number of an alkylene group between amide groups is 5 or less among the above-exemplified polyamides. Although there is no particular limitation for a lower limit of the average carbon number of the alkylene group between the amide groups, it is preferred to be 3 or more when available monomer ingredients are taken into consideration. As to the polyamide resin (A), polyamide 6, polyamide 66 and polyamide MXD6 are preferred in view of easy availability and, among them, polyamide 66 is more preferred.

As to the polyamide resin (B), it is possible to use, for example, a polyamide resin where an average carbon number of an alkylene group between amide groups is more than 5 among the above-exemplified polyamides. The average carbon number of the alkylene group between the amide groups is preferred to be 5.5 or more, more preferred to be 6 or more, and further preferred to be 6.5 or more. Although there is no particular limitation for an upper limit of the average carbon number of the alkylene group between the amide groups, it is preferred to be 15 or less, more preferred to be 12 or less when available monomer ingredients are taken into consideration. As to the polyamide resin (B), polyamide 610, polyamide 1010, polyamide 1012, polyamide 11, polyamide 12 and polyamide 10T/11 are preferred in view of easy availability and excellent effect and, among them, polyamide 610 is more preferred.

The polyamide resin (B) exhibits lower saturated water absorption rate compared with the polyamide resin (A). Regarding a saturated water absorption rate of a polyamide resin, a value suggested by data described in "Handbook of Polyamide Resin, edited by Osamu Fukumoto, published by Nikkan Kogyo Shimbunsha, page 113, 1988" etc. can be taken as a reference. In addition, the saturated water absorption rate of the polyamide resin can be measured by a method mentioned in the Example section.

Ratio by mass of the polyamide (A) to the polyamide (B) or (A)/(B) is from 98/2 to 40/60, and more preferably from 90/10 to 50/50. When the polyamide (B) is less than 2 parts by mass, effects by compounding with the polyamide (B) are hardly expressed while, when it is more than 60 parts by mass, characteristics inherent to the polyamide (A) are deteriorated.

Although there is no particular limitation for a molecular weight of the polyamide resin as such, it is preferred to use such a polyamide resin wherein a relative viscosity measured in a concentration of 1% by mass in 98% (98% by mass) sulfuric acid at 25° C. is from 1.7 to 4.5, more preferably from 2.0 to 4.0, and further preferably from 2.0 to 3.5.

The metal cyanide salt (C) in the present invention is shown by the following general composition formula (1):

General composition formula . . . $A_x[M(CN)_y]$     (1)

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

The metal cyanide salt may also be a hydrate.

M in the above general composition formula (1) is at least one member of transition metal elements in groups 5 to 10 and periods 4 to 6 of a periodic table. As to the preferred metal element, there may be exemplified Fe, Co, Cr, Mn, Ir, Rh, Ru, V and Ni. When the valence of metal element is also taken into consideration, Fe(II), Fe(III), Co(III), Cr(III), Mn(II), Mn(III), Ir(III), Rh(III), Ru(II), V(IV), V(V), Co(II), Ni(II) and Cr(II) are preferred. Co(II), Co(III), Fe(II), Fe(III), Cr(III), Ir(III) and Ni(II) are more preferred. Fe(II) and Fe(III) are particularly preferred. Two or more kinds of metal may be present in the metal cyanide salt (C) (e.g., potassium hexacyanocobaltate (II) ferrate (II)). A is at least one member of alkali metal (such as Li, Na and K) and alkaline earth metal (such as Ca and Ba). y is an integer of from 3 to 6. x is selected in such a manner that the metal cyanide salt (C) becomes electrically neutral as a whole. Thus, x is a number calculated by (y−m)/a (wherein m is a valence of M and a is a valence of A). Particularly, y corresponds to a coordination number of M and is preferred to be 4 to 6, and particularly preferred to be 6.

Although examples of the metal cyanide salt (C) which can be used in the present invention are not particularly limited, preferred ones are potassium hexacyanoferrate (II), potassium hexacyanoferrate (III), sodium hexacyanoferrate (II), sodium hexacyanoferrate (III), potassium hexacyanocobaltate (III), sodium hexacyanocobaltate (III), potassium hexacyanoruthenate (II), calcium hexacyanocobaltate (III), potassium tetracyanonickelate (II), potassium hexacyanochromate (III), potassium hexacyanoiridiumate (III), calcium hexacyanoferrate (II), potassium hexacyanocobaltate (II) and lithium hexacyanocobaltate (III). More preferred ones are potassium hexacyanoferrate (II), potassium hexacyanoferrate (III), sodium hexacyanoferrate (II) and sodium hexacyanoferrate (III) in view of handling and safety.

In the present invention, compounding amount (content) of the above metal cyanide salt (C) to 100 parts by mass of a total amount of the polyamide resin (A) and the polyamide resin (B) is 0.5 to 20 part(s) by mass. A lower limit of the compounding amount of the metal cyanide salt (C) is preferably 0.5 to 10 part(s) by mass, more preferably 1 to 8 part(s) by mass, and further preferably 1 to 5 part(s) by mass.

When the compounding amount of the metal cyanide salt is less than 0.5 part by mass, there is almost no effect of expressing thermal aging resistance while, even when the compounding amount of the metal cyanide salt is more than 20 parts by mass, there is no further increase in thermal aging resistance. When the compounding amount of the metal cyanide salt (C) is 20 parts by mass or less, bad affection to mechanical characteristics is little unlike metal particles and metal oxide particles. Even particularly in the case of a composition reinforced with a glass fiber, breakage of the glass fiber can be suppressed whereby mechanical characteristics are rarely lowered.

When the metal cyanide salt (C) is a hydrate, its compounding amount shall be in terms of the mass as a compound including the water of hydration.

Although the reason why thermal aging resistance is expressed by the metal cyanide salt (C) in the present invention is not clear, it is likely that the metal cyanide salt (C) interacts with the polyamide resin near a surface layer of the composition and, as a result, a barrier effect for suppressing oxygen permeation is achieved thereby.

Further, as compared with an iron compound such as iron oxide which is a conventionally used thermal aging resisting compound, the metal cyanide salt (C) used in the present invention can suppress lowering of mechanical characteristics of the polyamide resin composition after the compounding. Iron oxide is a metal oxide in minerals and its Mohs' hardness is as very hard as 6. Accordingly, in a polyamide composition containing glass fiber, iron oxide breaks the glass fiber whereby the mechanical characteristics lower. On the other hand, since metal cyanide salt (C) is not a mineral, it does not break glass fiber in a polyamide resin composition containing the glass fiber whereby mechanical characteristics are excellent.

In the present invention, in addition to the metal cyanide salt (C), known thermostabilizer may also be used.

As to the copper compound which can be used in the present invention, there may be exemplified copper acetate, copper iodide, copper bromide, copper chloride, copper fluoride, copper laurate and copper stearate. Each of those copper compounds may be used solely or jointly. Copper acetate, copper iodide, copper bromide and copper chloride are preferred and cupric bromide is particularly preferably used. Content of the copper compound to 100 parts by mass of a total amount of the polyamide resin (A) and the polyamide resin (B) is preferred to be 0.0001 to 1 part by mass in terms of copper in the copper compound. When adding amount of the copper compound is less than 0.0001 part by mass, an effect of prevention of discoloration in severer environments under high-temperature atmosphere and ultraviolet irradiation is insufficient while, when adding amount of the copper compound is more than 1 part by mass, the effect of prevention of discoloration under the above severe environments reaches a saturation and, moreover, there is a risk of causing such a problem that metal die and screw, cylinder, etc. of extruders and molding machines are corroded. More preferable content is 0.0005 to 1 part by mass, and further preferable content is 0.005 to 0.2 part by mass.

Further, when the copper compound is added, it is preferred that an alkali metal halide compound such as potassium iodide or potassium bromide is used together therewith. As a result of such a joint use, separation of copper can be prevented. As to a method for adding the copper compound, addition may be done in any stage of the preparation of the polyamide resin and there is no limitation for the adding method. Thus, for example, any of the following method is acceptable: a method wherein the copper compound is added to an aqueous solution of a material salt of polyamide; a method wherein the copper compound is added by injection into melted polyamide during the course of melt polymerization; and a method wherein, after finishing the polymerization, the polyamide pellets are granulated and blended with powder or master batch of the copper compound, and the resulting mixture is melt-kneaded using an extruder or a molding machine.

It is also possible in the present invention to compound an auxiliary stabilizer such as antioxidant (e.g., antioxidant of a hindered phenol type, antioxidant of a phosphorus type, antioxidant of a sulfur type and antioxidant of an amine type) and a light stabilizer.

As to the antioxidant of a hindered phenol type, known compounds may be used. Each of them may be used either solely or in combination. Among the antioxidants of a hindered phenol type as such, phenol of two or more functions is preferred and a semi-hindered type such as triethylene glycol bis[3-(3-tert-butyl-5-methyl-4-hydroxyphenyl)propionate] (Irganox 245) is preferred due to its little discoloration.

When the antioxidant of a hindered phenol type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto a surface of a molded product may happen.

The antioxidant of a phosphorus type is at least one member selected from antioxidants of inorganic and organic phosphorus types. Examples of the antioxidant of an inorganic phosphorus type are hypophosphites such as sodium hypophosphite and a phosphite.

As to the antioxidant of an organic phosphorus type, commercially available antioxidant of an organic phosphorus type in a phosphite type may be used. It is preferred to use a compound containing organic phosphorus which does not generate phosphoric acid by thermal decomposition. As to the compound containing organic phosphorus as such, known compounds may be used.

When the antioxidant of a phosphorus type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, flash may be generated in a molded product.

When the antioxidants of inorganic and organic phosphorus types are used together in the present invention, compounding amount of an antioxidant can be made small whereby that is preferred.

As to the antioxidant of an amine type which may be used in the present invention, known compounds may be used. In addition, a secondary arylamine may also be listed as the antioxidant of an amine type. The secondary arylamine stands for an amine compound containing two carbon radicals which are chemically bonded to nitrogen atom, wherein at least one of the carbon radicals or preferably both is/are aromatic group.

When the antioxidant of an amine type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto a surface of a molded product may happen.

As to the antioxidant of a sulfur type which may be used in the present invention, known compounds may be used.

When the antioxidant of a sulfur type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto a surface of a molded product may happen.

A light stabilizer which may be used in the present invention is preferred to be one or more kind(s) of light stabilizer(s) of a hindered amine type (HALS).

Preferably, HALS is a compound which is derived from a substituted piperidine compound or, particularly, a compound which is derived from an alkyl-substituted piperidinyl or piperazinone compound and an alkoxy-substituted piperidinyl compound. As to such compounds, known compounds may be used.

In the present invention, a mixture of secondary arylamine with HAL may be used. Preferred embodiment thereof contains at least two kinds of auxiliary stabilizers in which at least one is selected from secondary aryl amine and at least another is selected from a group of HALS. When the mixture of auxiliary stabilizers is compounded, its whole compounding amount (total content) to 100 parts by mass of polyamide resin is preferred to be 0.5 to 10 part(s) by mass, and more preferred to be 0.5 to 3 part(s) by mass. When the whole compounding amount is less than 0.5 part by mass, an effect of enhancing thermal aging resistance is insufficient. On the other hand, when the whole compounding amount is more than 10 parts by mass, the effect may reach a saturation or blooming onto a surface of a molded product may happen.

In the present invention, it is also possible that strength, rigidity, heat resistance, etc. can be significantly enhanced by addition of a reinforcing material (D). As to the reinforcing material (D) as such, there may be exemplified glass fiber, carbon fiber, metal fiber, aramid fiber, asbestos, potassium titanate whisker, wollastonite, glass flakes, glass beads, talc, mica, clay, calcium carbonate, barium sulfate, titanium oxide and aluminum oxide. Among them, glass fiber of a chopped strand type is used preferably.

In compounding the above, its compounding amount (content) in the polyamide resin composition is preferred to be 5 to 60% by mass, and more preferred to be 10 to 50% by mass.

Within such an extent that the object of the present invention is not deteriorated, it is possible to add up to about 5 parts by mass of one or more kind(s) of common additive(s) such as ultraviolet absorber (e.g., resorcinol, salicylate, benzotriazole and benzophenone), lubricant, mold-releasing agent, nucleating agent, plasticizer, antistatic agent and coloring agent (e.g., dyes and pigments) to 100 parts by mass of the polyamide resin. The polyamide resin composition of the present invention may contain each of the above-mentioned ingredients. In the composition excluding the above reinforcing material (D), the total amount of the polyamide resin ((A) and (B)) and the metal cyanide salt (C) is preferred to be 90% by mass or more, and more preferred to be 95% by mass or more.

In the present invention, there is no particular limitation for a method for adding the above-mentioned metal cyanide salt (C) and other additive to the polyamide resin but any method may be adopted therefor. Examples thereof are a method wherein all ingredients are preliminarily mixed and then kneaded in an extruder or a kneader, and a method wherein any several ingredients are kneaded in an extruder or a kneader and the resulting pellets are further kneaded and compounded with other ingredients.

A retention rate of tensile strength of a molded product prepared by injection molding of the polyamide resin composition of the present invention after being subjected to a thermal treatment at 200° C. for 1000 hours can be 80% or more. The above molded product is a test piece molded in accordance with the description under the following item for Examples. The above thermal treatment is such a treatment being conducted according to the procedures mentioned under the following item for Examples. The retention rate of tensile strength is a retention rate of tensile strength of the test piece after the thermal treatment to tensile strength of the test piece before the thermal treatment. The retention rate of tensile strength is more preferred to be 85% or more.

The polyamide resin composition of the present invention can be made into a molded product by, for example, injection molding, extrusion molding, thermal molding, compression molding, or the so-called hollow process represented by blow molding, die slide molding, etc. It is also possible that the molded product as such is made into a molded product by subjecting to a secondary processing such as a welding process including, for example, oscillation welding, hot plate welding or ultrasonic wave welding. Preferred ones are injection molding or blow molding product and a molded product prepared by the secondary processing thereof.

Examples of the use of the molded product made of the polyamide resin composition of the present invention in the fields of automobiles and vehicles are cylinder head cover, engine cover, housing for intercooler, valve, end cap, caster, trolley parts, etc.; inspiratory parts such as inspiratory pipe (air duct) or, particularly, inspiratory manifold; connector, wheel, fan wheel, storing container for cooling material and housing or housing member for heat exchanger; radiator, thermostat, coolant, water-supplying pump, heater, fastening element, oil saucer and housing for exhausting system such as muffler and catalyst converter; and timing chain belt front cover, gear box, bearing, gasoline cap, seat parts, headrest, door handle, wiper parts, etc.

In the electric/electronic instrument field, examples are circuit substrate parts, housing, film, conductor, switch, terminal strip, relay, resister, condenser, coil, lamp, diode, LED, transistor, connector, controller, memory, bolt, coil bobbin, plug, plug parts, mechatronics parts, parts for household electric appliances (such as cooking instruments, washer, refrigerator and air conditioner) and sensor.

In the fields relating to daily life and to furniture/building materials, there are exemplified wheel chair and baby car parts as well as parts for legs of a chair, armrest, handrail, window frame and door knob.

Examples

As hereunder, the present invention will be more specifically illustrated by referring to Examples although the present invention is not limited to those Examples. Measured values mentioned in Examples were measured by the following methods.

(1) Raw Materials Used

Polyamide 6: relative viscosity RV=2.7; TP-4208 manufactured by Shyuusei; an average carbon number of an alkylene group between amide groups is 5; saturated water absorption rate is 10%

Polyamide 66: relative viscosity RV=2.7; Stabamid 27 AE 1K manufactured by Rhodia; an average carbon number of an alkylene group between amide groups is 5; saturated water absorption rate is 8.0%

Polyamide 610: relative viscosity RV=2.7; HIPROLON70NN manufactured by Arkema; an average carbon number of an alkylene group between amide groups is 7; saturated water absorption rate is 3.5%

Polyamide 1010: relative viscosity RV=2.7; HIPROLON200NN manufactured by Arkema; an average carbon number of an alkylene group between amide groups is 9; saturated water absorption rate is 2.5%

Polyamide 10T/11: relative viscosity RV=2.7; CMNO manufactured by Arkema; an average carbon number of an alkylene group between amide groups is 7; saturated water absorption rate is 3.5%

Potassium ferrocyanide trihydrate (potassium hexacyanoferrate (II) trihydrate), manufactured by Wako Pure Chemical Industries, 99% purity Potassium ferricyanide (potassium hexacyanoferrate (III)), manufactured by Wako Pure Chemical Industries, 99% purity Iron (II) phthalocyanine, manufactured by Wako Pure Chemical Industries, 98.0% purity Iron (II) oxide, manufactured by Wako Pure Chemical Industries Iron (III) oxide, manufactured by Wako Pure Chemical Industries Antioxidant of a phenol type: Irganox 245 manufactured by BASF Cupric bromide, manufactured by Wako Pure Chemical Industries, 99.0% purity Glass fiber: T-275H manufactured by Nippon Electric Glass)

(2) Test Methods

Tensile strength, and tensile elongation at break: A molded product was prepared in accordance with ISO 527-1,2 using IS-100 of Toshiba Machine as an injection molding machine, wherein cylinder temperature was set at 280° C. and wherein die temperature was set at 90° C. The resulting molded product was used for the measurement in accordance with ISO 527-1,2.

Thermal aging test: A test piece was subjected to a thermal treatment in an air oven of a recycling type (NH-401 S, a hot-air circulating dryer manufactured by Nagano Kagaku Kikai Seisakusho) in accordance with the procedure mentioned in detail in ISO 2578. The test piece was taken out from the oven after predetermined testing hours (1000 and 2000 hours) under the environment of 200° C., cooled down to room temperature and tightly closed in a bag backed with aluminum until preparation for the test was finished. After that, tensile strength, and tensile elongation at break were measured in accordance with ISO 527-1. Average value obtained from three test pieces was adopted.

Each of a retention rate of tensile strength, and a retention rate of tensile elongation at break is a retention rate after subjecting to a thermal treatment of 1000 hours when the initial value without thermal treatment was assumed to be 100%.

Resistance to calcium chloride: The molded product prepared above was used and the test was conducted according to the cycles as shown below.

Pretreatment: The molded product is allowed to stand for 24 hours in a vessel of constant temperature and constant humidity (LH34-15 manufactured by Nagano Science) being set at 50° C. and 95% RH.

1. A 10% aqueous solution of calcium chloride is applied onto the molded product using a swab.
2. The molded product is allowed to stand for 30 minutes in an air of ambient temperature.
3. The molded product is allowed to stand for 4 hours in a hot-air drier (hot-air circulating drier NH-401S manufactured by Nagano Kagaku Kikai Seisakusho) set at 145° C.
4. The molded product is allowed to stand for 15.5 hours in a vessel of constant temperature and constant humidity (LH34-15 manufactured by Nagano Science) set at 50° C. and 95% relative humidity.

The above-mentioned "1." to "4." were conducted in ten cycles. After finishing "4." in each cycle, a surface of the molded product was observed under a stereoscopic microscope to judge a cycle number at which cracks were generated. In such a case wherein no crack was generated even after conducting ten cycles, that is expressed as "10<".

Saturated water absorption rate: A molded product was prepared in accordance with ISO 527-1,2 using IS-100 of Toshiba Machine as an injection molding machine, wherein cylinder temperature was set at 280° C. and wherein die temperature was set at 90° C. The resulting molded product was dipped in distilled water of 100° C. for predetermined time, and changes in the mass were measured. A mass changing rate when the changes in the mass become nil was calculated by the following formula (1) whereupon the saturated water absorption rate was determined.

{[(Mass after water absorbing treatment)−(Mass in the initial stage)]/[Mass in the initial stage]}× 100=Water absorption rate  (1)

As to the resin composition mentioned as Examples and Comparative Examples, each of the above-mentioned raw materials was compounded in a ratio (ratio by mass) mentioned in Tables 1 and 2 using a biaxial extruder (STS 35 manufactured by Coperion) and subjected to melting and kneading to give pellets (about 2.5 mm in diameter and about 2.5 mm in length). The resulting pellets were used after drying at 100° C. for 4 hours or more using a hot-air circulating dryer. Results of the evaluation are shown in Tables 1 and 2.

TABLE 1

| | | Examples | | | | | |
|---|---|---|---|---|---|---|---|
| | | 1 | 2 | 3 | 4 | 5 | 6 |
| resin composition | PA6 | 39 | 39 | | | | 39 |
| | PA66 | | | 39 | 61 | 39 | |
| | PA610 | 30 | | 30 | | | 30 |
| | PA1010 | | 30 | | 7 | | |
| | PA10T/11 | | | | | 30 | |
| | potassium hexacyanoferrate (II) trihydrate | 1 | 1 | 1 | 2 | 2 | |
| | potassium hexacyanoferrate (III) | | | | | | 1 |
| | iron (II) phthalocyanine | | | | | | |
| | iron (II) oxide | | | | | | |
| | iron (III) oxide | | | | | | |
| | antioxidant of phenol type | 0.2 | 0.2 | 0.2 | 0.2 | 0.2 | 0.2 |
| | cupric bromide | 0.02 | 0.02 | 0.02 | 0.02 | 0.02 | 0.02 |
| | glass fiber | 30 | 30 | 30 | 30 | 30 | 30 |
| composition characteristics | initial (without thermal treatment) | | | | | | |
| | tensile strength (MPa) | 172 | 165 | 175 | 170 | 173 | 170 |
| | tensile elongation at break (%) | 2.5 | 2.6 | 2.1 | 2.2 | 2.2 | 2.2 |
| | after thermal treatment at 200° C. × 1000 hours | | | | | | |
| | tensile strength (MPa) | 168 | 162 | 160 | 157 | 155 | 158 |
| | tensile elongation at break (%) | 2.2 | 2.2 | 1.9 | 1.8 | 1.8 | 1.8 |
| | retention rate of tensile strength (%) | 98 | 98 | 91 | 92 | 90 | 92 |
| | retention rate of tensile elongation at break (%) | 88 | 85 | 90 | 82 | 82 | 82 |

TABLE 1-continued

|  | Examples |  |  |  |  |  |
|---|---|---|---|---|---|---|
|  | 1 | 2 | 3 | 4 | 5 | 6 |
| saturated water absorption rate (%) | 7.4 | 6.8 | 6.2 | 7.5 | 6.2 | 7.4 |
| resistance to calcium chloride (cycle at which cracks were generated) | 10< | 10< | 10< | 10< | 10< | 10< |

TABLE 2

| | | Comparative Examples | | | | | | | |
|---|---|---|---|---|---|---|---|---|---|
| | | 1 | 2 | 3 | 4 | 5 | 6 | 7 | 8 |
| resin composition | PA6 | | | | | | | 69 | 70 |
| | PA66 | 69.8 | 67 | 68.5 | 68.5 | 69 | 70 | | |
| | PA610 | | | | | | | | |
| | PA1010 | | | | | | | | |
| | PA10T/11 | | | | | | | | |
| | potassium hexacyanoferrate (II) trihydrate | 0.2 | 3 | | | | | 1 | |
| | potassium hexacyanoferrate (III) | | | | | | | | |
| | iron (II) phthalocyanine | | | | | 1 | | | |
| | iron (II) oxide | | | 1.5 | | | | | |
| | iron (III) oxide | | | | 1.5 | | | | |
| | antioxidant of phenol type | 0.2 | 0.2 | 0.2 | 0.2 | 0.2 | 0.2 | 0.2 | 0.2 |
| | cupric bromide | 0.02 | 0.02 | 0.02 | 0.02 | 0.02 | 0.02 | 0.02 | 0.02 |
| | glass fiber | 30 | 30 | 30 | 30 | 30 | 30 | 30 | 30 |
| composition characteristics | initial (without thermal treatment) | | | | | | | | |
| | tensile strength (MPa) | 188 | 180 | 170 | 170 | 185 | 195 | 150 | 150 |
| | tensile elongation at break (%) | 2.5 | 2.5 | 2.2 | 2.2 | 2.4 | 3.0 | 3.0 | 3.0 |
| | after thermal treatment at 200° C. × 1000 hours | | | | | | | | |
| | tensile strength (MPa) | 70 | 167 | 85 | 52 | 82 | 70 | 150 | 80 |
| | tensile elongation at break (%) | 0.8 | 2.2 | 1.0 | 0.6 | 1.0 | 0.8 | 3.0 | 1.0 |
| | retention rate of tensile strength (%) | 37 | 93 | 50 | 31 | 44 | 36 | 100 | 53 |
| | retention rate of tensile elongation at break (%) | 32 | 88 | 46 | 27 | 41 | 27 | 100 | 33 |
| | saturated water absorption rate (%) | 8.0 | 8.0 | 8.0 | 8.0 | 8.0 | 8.0 | 10.0 | 10.0 |
| | resistance to calcium chloride (cycle at which cracks were generated) | 8 | 8 | 8 | 8 | 8 | 8 | 2 | 2 |

In Examples 1 to 6, the retention rate of tensile strength after treating at 200° C. for 1000 hours was 90% or more, and no crack was generated even in the test for resistance to calcium chloride.

Comparative Examples 1 and 2 are examples wherein potassium ferrocyanide trihydrate was added to polyamide 66. In Comparative Examples 1 and 2, cracks were generated in the test for resistance to calcium chloride. Comparative Examples 3 to 5 are examples wherein a compound other than metal cyanide salt was added. In Comparative Examples 3 to 5, cracks were generated in the test for resistance to calcium chloride, and the retention rate of tensile strength after treating at 200° C. for 1000 hours greatly lowered. Comparative Example 6 is an example wherein only copper bromide and phenol-type antioxidant were added to polyamide 66. In Comparative Example 6, cracks were generated in the test for resistance to calcium chloride, and the retention rate of tensile strength after treating at 200° C. for 1000 hours greatly lowered. Comparative Example 7 is an example wherein potassium ferrocyanide trihydrate was added to polyamide 6. In Comparative Example 7, cracks were generated in the test for resistance to calcium chloride. Comparative Example 8 is an example wherein polyamide 6 was used. In Comparative Example 8, cracks were generated in the test for resistance to calcium chloride.

INDUSTRIAL APPLICABILITY

The polyamide resin composition of the present invention is a polyamide resin composition which exhibits an effective resistance to snow-melting agents such as calcium chloride and zinc chloride and to coolants for automobile engines, and also exhibits an excellent thermal aging resistance in a level durable to high-temperature and long-term environments of 200° C. and longer than 1000 hours, and further exhibits excellent mechanical characteristics. Accordingly, the polyamide resin composition of the present invention can be particularly utilized for automobile parts.

The invention claimed is:

1. A polyamide resin composition comprising a polyamide resin (A), a polyamide resin (B), and a metal cyanide salt of Formula (1):

$$A_x[M(CN)_y],\qquad \text{Formula (1)}$$

wherein, in the Formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A, wherein an average carbon number of an alkylene group between amide groups in the polyamide resin (A) is 5 or less, wherein an average carbon number of an alkylene group between amide groups in the polyamide resin (B) is more than 5, wherein a ratio by mass (A)/(B) of the polyamide resin (A) to the polyamide resin (B) is from 98/2 to 40/60, and wherein the polyamide resin composition comprises 0.5 to 20 part(s) by mass of the metal cyanide salt of Formula (1) with respect to 100 parts by mass of a total amount of the polyamide resin (A) and the polyamide resin (B).

2. The polyamide resin composition according to claim 1, wherein the polyamide resin (A) is at least one member selected from a group consisting of polyamide 6, polyamide 66 and polyamide MXD6.

3. The polyamide resin composition according to claim 1, wherein the polyamide resin (B) is at least one member selected from a group consisting of polyamide 610, polyamide 1010, polyamide 1012, polyamide 11, polyamide 12 and polyamide 10T/11.

4. The polyamide resin composition according to claim 1, wherein the polyamide resin composition further contains a reinforcing material (D) in an amount of 5 to 60% by mass relative to the total mass of the polyamide resin composition.

5. The polyamide resin composition according to claim 1, wherein M in the Formula (1) is iron.

6. The polyamide resin composition according to claim 1, wherein the metal cyanide salt in the Formula (1) is one or more member(s) selected from a group consisting of alkali metal hexacyanoferrate (II) and alkali metal hexacyanoferrate (III).

7. The polyamide resin composition according to claim 1, wherein, to 100 parts by mass of the total amount of the polyamide resin (A) and the polyamide resin (B), a copper compound is compounded in an amount of 0.0001 to 1 part by mass as copper.

\* \* \* \* \*